United States Patent
Cretegny et al.

(10) Patent No.: US 8,574,686 B2
(45) Date of Patent: Nov. 5, 2013

(54) MICROWAVE BRAZING PROCESS FOR FORMING COATINGS

(75) Inventors: Laurent Cretegny, Niskayuna, NY (US); Daniel Joseph Lewis, Delmar, NY (US); Jeffrey Reid Thyssen, Delmar, NY (US)

(73) Assignee: General Electric Company, Schenectady, NY (US)

( * ) Notice: Subject to any disclaimer, the term of this patent is extended or adjusted under 35 U.S.C. 154(b) by 1255 days.

(21) Appl. No.: 11/611,259

(22) Filed: Dec. 15, 2006

(65) Prior Publication Data
US 2008/0145566 A1    Jun. 19, 2008

(51) Int. Cl.
*H05H 1/00* (2006.01)
*B23K 31/02* (2006.01)
*B23K 35/24* (2006.01)

(52) U.S. Cl.
USPC .......................................... 427/533; 228/119

(58) Field of Classification Search
USPC ........................... 427/553; 228/119; 419/6, 11
See application file for complete search history.

(56) References Cited

U.S. PATENT DOCUMENTS

| | | |
|---|---|---|
| 5,321,223 A | 6/1994 | Kimrey, Jr. et al. |
| 5,397,530 A | 3/1995 | Narasimhan et al. |
| 5,736,092 A | 4/1998 | Apte et al. |
| 5,740,941 A | 4/1998 | Lemelson et al. |
| 5,741,941 A | 4/1998 | Bahrmann |
| 5,808,282 A | 9/1998 | Apte et al. |
| 6,004,505 A | 12/1999 | Roy et al. |
| 6,063,333 A | 5/2000 | Dennis |
| 6,155,331 A | 12/2000 | Langer et al. |
| 6,165,616 A | 12/2000 | Lemelson et al. |

(Continued)

FOREIGN PATENT DOCUMENTS

| | | |
|---|---|---|
| EP | 0456481 | 5/1991 |
| EP | 1642666 | 5/2006 |
| WO | 2004073037 | 8/2004 |
| WO | WO2004073037 | 8/2004 |

OTHER PUBLICATIONS

Dinesh Agrawal (Sohn International Symposium Advanced Processing of Metals and Materials vol. 4—New, Improved and Existing Technologies:Non-Ferrous Materials Extraction and Processing Edited by F. Kongoli and R.G. Reddy TMS (The Minerals, Metals & Materials Society), 2006, pp. 183-192) Used only as evidence.*

*Primary Examiner* — Nadine G Norton
*Assistant Examiner* — Mahmoud Dahimene
(74) *Attorney, Agent, or Firm* — Penelope A. Clarke; Gary M. Hartman; Domenica N. S. Hartman

(57) ABSTRACT

A process for forming a coating on a surface of a substrate, so that heating of the coating material is selective and sufficient to cause at least partial melting of the coating material and permit bonding to the substrate without excessively heating the substrate so as not to significantly degrade its properties. The process generally entails forming a brazing paste containing powder particles dispersed in a binder. The particles are formed of a composition that is susceptible to microwave radiation. The brazing paste is then applied to the surface of the substrate and subjected to microwave radiation so that the particles couple with the microwave radiation and are sufficiently heated to burn off the binder and then at least partially melt to form an at least partially molten layer on the substrate. The microwave radiation is then interrupted to allow the at least partially molten layer to cool, solidify, and form the coating.

21 Claims, 1 Drawing Sheet

(56) References Cited

U.S. PATENT DOCUMENTS

| | | |
|---|---|---|
| 6,172,346 B1 | 1/2001 | Wroe |
| 6,183,689 B1 | 2/2001 | Roy et al. |
| 6,293,986 B1 | 9/2001 | Rodiger et al. |
| 6,512,216 B2 | 1/2003 | Gedevanishvili et al. |
| 6,610,241 B2 | 8/2003 | Shrout et al. |
| 6,805,835 B2 * | 10/2004 | Roy et al. ......................... 419/11 |
| 6,870,124 B2 | 3/2005 | Kumar et al. |
| 2002/0106611 A1 | 8/2002 | Bhaduri et al. |
| 2005/0002818 A1 * | 1/2005 | Ichikawa et al. ................... 419/6 |
| 2005/0220692 A1 * | 10/2005 | Mangold et al. .............. 423/335 |
| 2006/0071053 A1 * | 4/2006 | Garimella ..................... 228/119 |

* cited by examiner

MICROWAVE BRAZING PROCESS FOR FORMING COATINGS

BACKGROUND OF THE INVENTION

This invention generally relates to coating methods, including processes and materials for use in the manufacturing, repair, and build-up of component surfaces. More particularly, this invention relates to a method of forming a coating by applying a brazing composition containing particles dispersed in a binder, in which the particles are of a material and size to be susceptible to heating and melting when subjected to microwave energy.

Components that operate in a gas turbine environment often require coatings resistant to environmental, thermal, and/or mechanical damage to extend their lives during operation. Coatings are also applied to gas turbine components for dimensional buildup to balance a component or repair its surface. Various coating processes have been developed to deposit metallic and ceramic coating materials capable of surviving and remaining adherent in the chemically and thermally hostile environment of a gas turbine. Examples include thermal spraying, physical vapor deposition (PVD), chemical vapor deposition (CVD), and brazing processes. Thermal spraying, PVD, and CVD processes are generally line-of-sight processes, complicating the coating process and increasing operation cost and time, particularly if not all surfaces of a component are to be coated. In addition, during the coating process the component is typically subjected to intense heat, such as from temperatures required to carry out the process and thermal conduction from the deposited coating. As an example, thermal spray processes, which include combustion flame spray, plasma arc spray, wire arc spray, detonation gun, and high velocity oxygen fuel (HVOF), generally involve propelling a powder or wire feedstock onto a roughened substrate surface while heating the feed stock with a plasma arc, DC arc, or combustion gases. The feed stock may reach temperatures in excess of 3000° C., during which the feed stock at least partially melts before impacting the surface, and thereafter cools and mechanically bonds to the roughened surface to form an adherent coating.

Brazing techniques employed to form coatings include the use of brazing pastes, brazing tapes, and sintered preforms containing or formed from metal alloy powders. In each case, the paste, tape, or preform is applied to a surface to be coated and then heated to a temperature sufficient to melt the alloy, but below the melting point of the substrate being brazed. On cooling, the alloy solidifies to form a permanent metallurgical bond with the substrate. Metal alloys used in brazing processes melt at lower temperatures than the substrates being repaired as a result of containing one or more melting point depressants, such as boron and/or silicon. Otherwise, the alloys typically have compositions similar to the base metal of the substrate being brazed, such that the temperature of the substrate may closely approach its melting temperature during the brazing process. Commonly-assigned U.S. Pat. No. 4,381,944 to Smith, Jr. et al., teaches a more advanced brazing technique in which a powder alloy mixture is prepared containing at least one alloy powder with a composition similar to the alloy being repaired, i.e., a nickel or cobalt-base super alloy, while at least a second alloy powder contains at least one melting point depressant, such as silicon and/or boron. At the braze temperature, the lower-melting second alloy powder melts and flows by capillarity, and carries with it particles of the higher-melting first alloy powder. During the repair cycle, there is at least a partial dissolution of the first alloy powder and the substrate into the molten second alloy, until the composition of the melt is altered enough that its melting point is increased and freezing occurs.

During thermal spray, PVD, CVD, and braze coating processes, the substrate may be heated to temperatures that can adversely affect the mechanical properties of the substrate, such as hardness and fatigue life, as a result of grain growth, incipient melting, recrystallization, or unfavorable phase formation. These processes also have the disadvantage of being high-overhead processes that require significant amounts of time, setup, and expense. An additional disadvantage of brazing techniques that use boron and/or silicon as melting point depressants is the potential for a reduction in mechanical and environmental properties of the resulting coating as a result of the minimal ductility of the borides and silicides they form by reaction with refractory elements. Boron and silicon can also diffuse into the substrate to adversely affect its mechanical and environmental properties.

BRIEF SUMMARY OF THE INVENTION

The present invention generally provides a process for forming a coating on a surface of a substrate, in which the heating source for the coating process is microwave radiation so that heating of the coating material is selective and sufficient to cause at least partial melting of the coating material and permit metallurgical bonding to the substrate on which the coating is being applied, but without excessively heating the substrate so as not to significantly degrade the properties of the substrate.

The process generally entails forming a brazing paste comprising powder particles dispersed in a binder. The powder particles are formed of a composition that is susceptible to microwave radiation. The brazing paste is then applied to the surface of the substrate, and then subjected to microwave radiation so that the powder particles within the brazing paste couple with the microwave radiation and are sufficiently heated to burn off the binder and then at least partially melt to form an at least partially molten layer on the surface of the substrate. The microwave radiation is then interrupted to allow the at least partially molten layer to cool and solidify to form the coating, which has the same composition as the powder particles and is bonded to the substrate.

According to the invention, the powder particles are sufficiently small, and therefore have a relatively large surface area to volume ratio, to be significantly more susceptible to absorbing microwave energy than the substrate being coated, which predominantly reflects the microwaves. As a result, complete melting of the particles can be achieved accompanied by only surface melting of the substrate that results from heat transfer by thermal conduction from the particles to the substrate. Such a result may be obtained even if the powder particles have the same or even higher melting temperature than the substrate. Melting of the particles can be achieved even if their composition is free of melting point depressants, such as boron and silicon, beyond any amounts of these elements that may be present in the substrate, including impurity levels.

From the above, it can be appreciated that the process of this invention can be applied to coating processes employed to repair or build up a substrate surface, or to form a thermal, mechanical, and/or environmentally-resistant coating that serves to protect the substrate. Because heating is by microwave radiation, the heating rate and melting of the powder particles are influenced by susceptibility to microwave radiation instead of location relative to a heating source. This aspect of the invention enables the powder particles to melt prior to melting of the substrate surface contacted by the brazing paste, even if the powder particles have the same composition as the substrate, as would be typically preferred if building up a worn surface. As a result, thermally-induced damage to the substrate (e.g., grain growth, incipient melting, recrystallization, unfavorable phase formation, etc.) can be avoided, and minimal intermixing and interdiffusion occur between the coating and substrate materials that might degrade their often very different environmental and mechanical properties. Finally, the brazing paste can be applied to essentially any surface region of a substrate with minimal equipment requirements, and can be selectively applied to limited surface regions and to have a uniform or nonuniform thickness to form a coating whose coverage and physical properties can be tailored for the particular component being coated.

Other objects and advantages of this invention will be better appreciated from the following detailed description.

DETAILED DESCRIPTION OF THE INVENTION

The invention will be described with specific reference to processing of high temperature components of gas turbine engines, and particularly to coating or building up surfaces of such components. However, the invention has application to a variety of components and materials other than those discussed, and such variations are within the scope of this invention.

Figure 1:
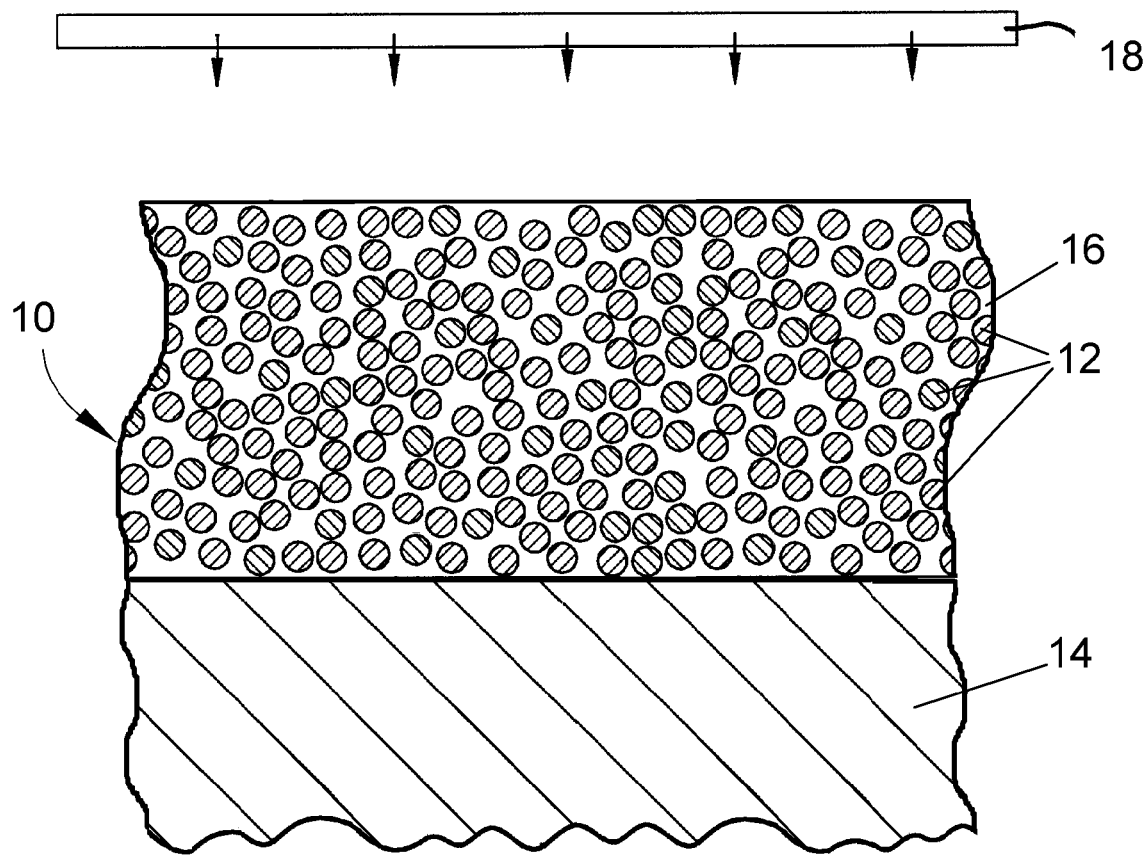
FIG. 1 schematically represents a brazing paste applied to the surface of a substrate and containing powder particles susceptible to microwave heating in accordance with an embodiment of the present invention.

FIG. 1 schematically represents a brazing paste 10 applied to a surface of a substrate 14. As a paste, the brazing paste 10 is necessarily pliable and readily capable of being spread over the surface of the substrate 14 with minimal force. The brazing paste 10 is represented as containing powder particles 12 dispersed in a binder matrix 16 that, according to known brazing practices with brazing tapes, burns off at temperatures below that required to melt the particles 12. The substrate 14 represents a surface region of a component to be protected, repaired, and/or built-up by a coating 20 formed from the brazing paste 10 and represented in FIG. 2. The substrate 14 can be formed of various materials, notable examples of which include nickel, cobalt, and iron-base superalloys commonly used for gas turbine engine components, as well as other metallic materials, intermetallic materials, ceramic materials, and ceramic matrix composite (CMC) materials.

According to the invention, the powder particles 12 of the brazing paste 10 are at least partially melted to form the coating 20 as a result of being subjected to microwave radiation 18, as discussed in more detail below. The particles 12 can be formed of a variety of materials, limited only by the requirement that the particles 12 have a composition that is capable of being heated by microwave radiation 26 to form the desired coating 20 with its desired properties, and is compatible with the material of the substrate 14 at temperatures sustained during the coating process and within the operating environment of the substrate 14. Materials capable of being heated when subjected to microwave radiation include electrical nonconductors (including ceramic materials) and conductors (including metallic and intermetallic materials) under appropriate conditions. Compatibility is assured if the particles 12 have the very same composition as that of the substrate 14, though suitable compatibility can also be achieved if the particles 12 and substrate 14 do not have compositions prone to detrimental interdiffusion at elevated temperatures that would lead to the loss of desired mechanical or environmental properties.

In one embodiment, the particles 12 may be formed of a conventional braze alloy that contains significant amounts of one or more melting point depressants, such as boron or silicon. However, a preferred aspect of the invention is that the particles 12 do not contain any element capable of serving as a melting point depressant in an amount that exceeds the level for that element in the substrate 14 being coated. Accordingly, if the substrate 14 is formed of a nickel-base superalloy containing less than one weight percent of boron and silicon individually, the particles 12 can also be formed of a composition that contains less than one weight percent of boron and silicon individually, or may contain boron and silicon only at impurity levels. As such, the particles 12 may contain one or more melting point depressants, though not at levels that would lead to an unacceptable loss of properties in the substrate 14 as a result of diffusion of the depressant into the substrate 14 during heating of the particles 12 and later during the life of the substrate 14. Furthermore, the particles 12 can be formed of a superalloy such as of the type used in turbine applications, or an alloy whose base composition is similar to that of the substrate 14 but modified to contain alloying constituents different from or at different levels than the substrate 14 in order to achieve thermal, mechanical, and/or environmental properties superior to that of the substrate 14. Though all of the particles 12 are not required to have the same composition, the present invention permits such uniformity.

According to a preferred aspect of the invention, at least some and preferably all of the powder particles 12 must be sufficiently small to be highly susceptible to microwave radiation 18, thereby preferentially coupling with the microwave radiation 18 (as compared to the substrate 14) to significantly enhance selective heating and at least partially melting of the particles 12 by the microwave radiation 18. For this purpose, it is believed the particles 12 should have a surface area to volume ratio on the order of at least 0.06 $\mu m^2/\mu m^3$, more preferably about 0.14 $\mu m^2/\mu m^3$ or higher. Depending on the composition of the particles 12, coupling with the microwave radiation 18 is generally the result of the particles 12 being sufficiently conductive to generate eddy currents induced by the magnetic field of the microwave radiation 18, and/or possessing a level of electrical resistivity capable of generating joule heating from the eddy currents. It is known that the magnetic loss component of susceptibility for a material in very fine powder size is dependent on factors such as microwave power and frequency. Conversely it is believed that, for a given microwave power and frequency, the interaction between microwave energy and a particular material will be optimum at a distinct particle size for conventional microwave conditions (about 2.45 GHz and about 1 to about 10 kW power). Particle sizes above or below the optimum particle size will not couple as well with microwave radiation. Consequently, suitable and preferred maximum sizes for the particles 12 will depend on the particular application, temperatures, and materials involved. Generally speaking, it is believed that a maximum particle size is on the order of about 140 mesh (about 100 micrometers), more preferably 325 mesh (about 44 micrometers) and smaller. Minimum particle sizes can be as little as nanoscale, e.g., less than 100 nanometers.

In contrast to the particles 12, bulk metals such as the substrate 14 tend to reflect microwave radiation, and typical binders used in braze applications tend to be transparent to microwave radiation. As noted above, this aspect of the present invention makes possible the melting of particles 12 to form a coating 20 having the very same composition as the substrate 14, as well as materials with the same or even higher melting point as the substrate 14, without any thermally-induced damage to the substrate 14. For example, a nickel-base superalloy component can be coated with a material having the same nickel-base superalloy composition or another nickel-base alloy, in other words, an alloy whose base metal is the same as the base metal of the substrate 14. In this manner, degradation of the properties of the substrate 14 resulting from interdiffusion with the coating 20 can be essentially if not entirely avoided. In view of the capability of melting particles 12 formed of materials having melting points approximately equal to or greater than that of the substrate 14, it should be appreciated that the term "brazing" as used herein is not limited to the conventional limitation of a joining operation performed at a temperature below the melting point of the metal being brazed.

A variety of binder materials for the binder matrix 16 are believed to be suitable for use in the present invention. Suitable binders are those that are substantially transparent to microwave radiation, notable examples of which include organic binders such as nitrocellulose, polyethylene oxide, water-based binders, etc., and proprietary binder compositions such as those commercially-available from the Vitta Corporation. Particularly preferred binders are those whose compositions are capable of being cleanly and completely burned off to leave little or no carbon char residue when heated to a temperature below the melting temperature of the material for the particles 12, for example, conventional nickel-base braze alloys having melting temperatures of as low as about 850° C. Suitable volume fractions for the particles 12 in the brazing paste 10 will depend in part on the materials of the particles 12 and binder matrix 16 and the desired consistency of the paste 10. Suitable binder volume fractions are believed to be in a range of about 2 to about 20%, preferably in a range of about 5 to about 10%, though lesser and greater volume fractions are foreseeable.

Microwave radiation can be applied to the brazing paste 10 in a multi-mode cavity, which as known in the art provides for a microwave field that does not establish a standing wave, but instead provides a uniform amplitude of both its magnetic and electric components. Alternatively, a single-mode cavity can be used, in which case a standing or traveling wave is propagated, enabling the imposition of, to a certain extent, the relative amplitudes of the electric and magnetic components of the microwave field. A wide range of microwave frequencies could be used with the present invention, though in practice regulations will generally encourage or limit implementation of the invention to typically available frequencies, e.g., 2.45 GHz and 915 MHz, with the former believed to be preferred. However, it should be understood that other frequencies are technically capable of use. A benefit of using a lower frequency is the greater associated wavelength, which may be better suited for higher power transmission or processing of larger components. Suitable microwave power levels will depend on the size and composition of the particles 12, but are generally believed to be in a range of about 1 to about 10 kW, though lesser and greater power levels are also foreseeable.

Figure 2:
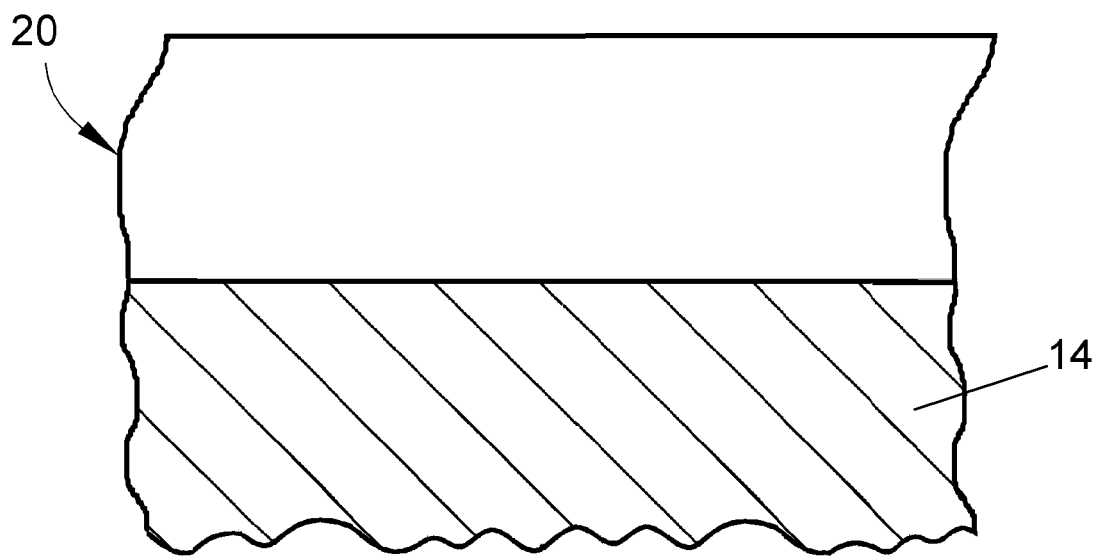
FIG. 2 is a cross-sectional view of a coating formed on the substrate of FIG. 1 as a result of subjecting the brazing paste to microwave radiation in accordance with a process of this invention.

The particular properties of the coating 20 represented in FIG. 2 will depend on the composition of the particles 12 and the microstructural and macrostructural properties of the coating 20. If the particles 12 are only partially melted when subjected to microwave radiation 18, the resulting coating 20 will tend to be a sintered porous coating, whereas complete melting of the particles 12 leads to a denser, nonporous coating. Furthermore, the coating 20 may serve a wide variety of purposes. For example, the coating 20 may be intended to repair or build up the surface of the substrate 14, or provide thermal, mechanical, and/or environmental protection to the substrate 14. In certain embodiments of the invention, the coating 20 preferably has at least one property that is superior to the substrate 14 it covers. Non-limiting examples include greater corrosion, oxidation, wear, and/or erosion resistance, and/or lower thermal conductivity than the substrate 14. These properties can be optimized for certain surface regions of the substrate 14 by varying the thickness of the brazing paste 10 when applied to the surface of the substrate 14, such that the coating 20 is thicker in certain areas where greater protection is required and thinner in other areas where lower levels of protection are permitted. Variations in properties can also be obtained by using two or more different brazing pastes 10 on the same substrate 14. For example, two different brazing pastes 10 containing powder particles 12 of different compositions can be applied to the same substrate 14, so that the resulting coating 20 has regions with different compositions.

Variations in properties can also be obtained by forming the powder or brazing paste 10 to contain particles of different sizes and/or compositions. For example, the paste 10 can contain particles 12 of different compositions and/or size to tailor the properties of the coating 20. The paste 10 can also contain particles 12 of different compositions and/or size for the purpose of tailoring coupling of the powder with the microwave radiation 18, for example, to promote and/or limit melting of the powder. As a particular example, the powder or its particles 12 can be formulated to contain one or more materials that are highly susceptible to microwave radiation and, in powder form, will preferentially couple with the microwave radiation 18. Such high-susceptibility materials can be provided in the form of separate particles mixed into the powder, or can be alloyed with the individual powder particles 12. Depending on the composition of the particles 12 and the intended use of the coating 20, suitable high-susceptibility materials can be chosen on the basis of their ability to dissolve into the composition of the particles 12 when molten without creating inhomogeneities in the coating 20. In view of the foregoing, potentially suitable high-susceptibility materials are believed to include, but are not limited to, silicon, germanium, gallium, cobalt, iron, zinc, titanium, carbon (e.g., carbon nano-tubes or fine graphite powder), aluminum, tantalum, niobium, rhenium, hafnium, molybdenum, nickel oxide, and silicon carbide.

While the invention has been described in terms of particular embodiments, it is apparent that other forms could be adopted by one skilled in the art. Accordingly, the scope of the invention is to be limited only by the following claims.

The invention claimed is:

1. A process for forming a coating on a surface of a substrate, the process comprising:
    forming a brazing paste comprising powder particles dispersed in a binder, the powder particles formed of a composition susceptible to microwave radiation and having a higher melting temperature than the substrate;
    applying the brazing paste to the surface of the substrate;

subjecting the brazing paste to microwave radiation so that the powder particles within the brazing paste couple with the microwave radiation and are sufficiently heated to burn off the binder and then at least partially melt to form an at least partially molten layer on the surface of the substrate; and then interrupting the microwave radiation and allowing the at least partially molten layer to cool and solidify to form the coating, wherein the coating has the composition of the powder particles and is bonded to the substrate.

2. The process according to claim 1, wherein the powder particles are fully molten during the subjecting step and the coating is substantially nonporous.

3. The process according to claim 1, wherein the powder particles are only partially molten during the subjecting step and the coating is a porous sintered coating.

4. The process according to claim 1, wherein the surface of the substrate is formed of a metallic material.

5. The process according to claim 1, wherein the surface of the substrate is formed of a ceramic material.

6. The process according to claim 1, wherein the substrate and the composition of the powder particles are nickel-base alloys.

7. The process according to claim 1, wherein the substrate and the composition of the powder particles are formed of different materials, and the coating has at least one property superior to the substrate, wherein the property is selected from the group consisting of corrosion resistance, oxidation resistance, wear resistance, erosion resistance, and low thermal conductivity.

8. The process according to claim 7, wherein the brazing paste is applied to have a nonuniform thickness on the surface of the substrate, and the coating has a nonuniform thickness so that the at least one of the properties is superior in a first region of the coating as compared to a second region of the coating.

9. The process according to claim 1, wherein the coating is more corrosion resistant than the substrate.

10. The process according to claim 1, wherein the coating is more oxidation resistant than the substrate.

11. The process according to claim 1, wherein the coating is more erosion resistant than the substrate.

12. The process according to claim 1, wherein the coating has lower thermal conductivity than the substrate.

13. The process according to claim 1, further comprising:
   forming a second brazing paste comprising second powder particles dispersed in a second binder, the second powder particles having a second composition susceptible to microwave radiation; and then
   applying the second brazing paste to a second surface of the substrate;
   wherein during the subjecting step the second brazing paste is subjected to the microwave radiation so that the second powder particles within the second brazing paste couple with the microwave radiation and are sufficiently heated to burn off the second binder and then at least partially melt to form an at least partially molten second layer on the second surface of the substrate; and
   wherein during the interrupting step the at least partially molten second layer cools and solidifies to form a second coating having a different composition than the coating.

14. The process according to claim 1, wherein the binder is transparent to the microwave radiation.

15. The process according to claim 1, wherein the powder particles have a maximum particle size of about 100 micrometers.

16. The process according to claim 1, wherein the substrate is a portion of a gas turbine engine component.

17. The process according to claim 1, wherein the powder particles in the brazing paste have a maximum particle size of about 100 micrometers.

18. The process according to claim 1, wherein the powder particles in the brazing paste do not contain any element capable of serving as a melting point depressant, in an amount that exceeds the level for that element in the material of the substrate.

19. The process according to claim 18, wherein the substrate comprises a nickel-base superalloy; and the brazing paste comprises less than 1 wt. % of boron and silicon, individually.

20. A process for forming a coating on a surface region of a gas turbine engine component formed of a nickel-base superalloy, the process comprising:
   forming a brazing paste comprising powder particles dispersed in a binder, the powder particles being formed of a nickel-base alloy having a higher melting temperature than the substrate and optionally contains melting point depressants but in amounts not exceeding any amounts of the melting point depressants in the nickel-base superalloy of the surface region;
   applying the brazing paste to the surface region of the component;
   subjecting the brazing paste to microwave radiation so that the powder particles within the brazing paste couple with the microwave radiation and are sufficiently heated to burn off the binder and then melt to form a molten layer on the surface of the substrate; and then
   interrupting the microwave radiation and allowing the molten layer to cool and solidify to form the coating, wherein the coating has the metallic composition of the powder particles and is metallurgically bonded to the surface region.

21. The process according to claim 20, wherein the coating has at least one property superior to the substrate.

* * * * *